United States Patent [19]

Stoner

[11] 4,004,725

[45] Jan. 25, 1977

[54] APPARATUS FOR ASSEMBLING COMPONENTS OF A DYNAMOELECTRIC MACHINE

[75] Inventor: Jesse A. Stoner, DeKalb, Ill.

[73] Assignee: General Electric Company, Fort Wayne, Ind.

[22] Filed: Jan. 6, 1975

[21] Appl. No.: 539,038

Related U.S. Application Data

[63] Continuation of Ser. No. 401,177, Sept. 27, 1973, abandoned.

[52] U.S. Cl. .............................................. 228/49
[51] Int. Cl.[2] ...................................... B23K 37/06
[58] Field of Search ................. 164/50, 80, 94, 98, 164/108, 110, 112, 136, 332, 334, 336; 228/47, 49, 179, 183; 29/157.3 A, 157.3 R, 205 R, 596; 310/42, 91, 254

[56] References Cited

UNITED STATES PATENTS

| 709,925 | 9/1902 | Phelps | 164/367 |
|---|---|---|---|
| 898,631 | 9/1908 | Custer | 164/335 |
| 1,164,172 | 12/1915 | Denney | 164/110 X |
| 1,989,438 | 1/1935 | Woock et al. | 164/94 X |
| 3,168,767 | 2/1965 | Lutz | 164/110 X |
| 3,705,994 | 12/1972 | Berry | 310/91 |
| 3,844,024 | 10/1974 | Otto | 164/110 X |

FOREIGN PATENTS OR APPLICATIONS

| 1,594,425 | 6/1970 | France | 164/136 |
|---|---|---|---|
| 445,731 | 2/1968 | Switzerland | 164/337 |
| 991,240 | 5/1965 | United Kingdom | 164/80 |

Primary Examiner—Robert D. Baldwin
Attorney, Agent, or Firm—Joseph E. Papin

[57] ABSTRACT

Apparatus for assembling a pair of opposite end frames of a dynamoelectric machine to a structural component thereof disposed within means respectively in the end frames for receiving the structural component. The apparatus has means for moving at least one of the structural component and the end frames to an assembly position with the structural component disposed in the receiving means of the end frames and for supporting the structural component and the end frames in the assembly position. Means is utilized for providing a hardenable material in the receiving means adapted to be flowed therein so as to form a rigid tie between the end frames and the structural component upon the hardening of the hardenable material in the receiving means, respectively, with the structural components and the end frames being supported in the assembly position thereof by the moving and supporting means. Means is provided for inverting the moving and supporting means with the structural component and the end frames supported therein in the assembly position so as to dispose one of the end frames in a position wherein the hardenable material may be provided therein to form the rigid tie between the one end frame and the structural component subsequent to the formation of the rigid tie between the other of the end frames and the structural component.

26 Claims, 17 Drawing Figures

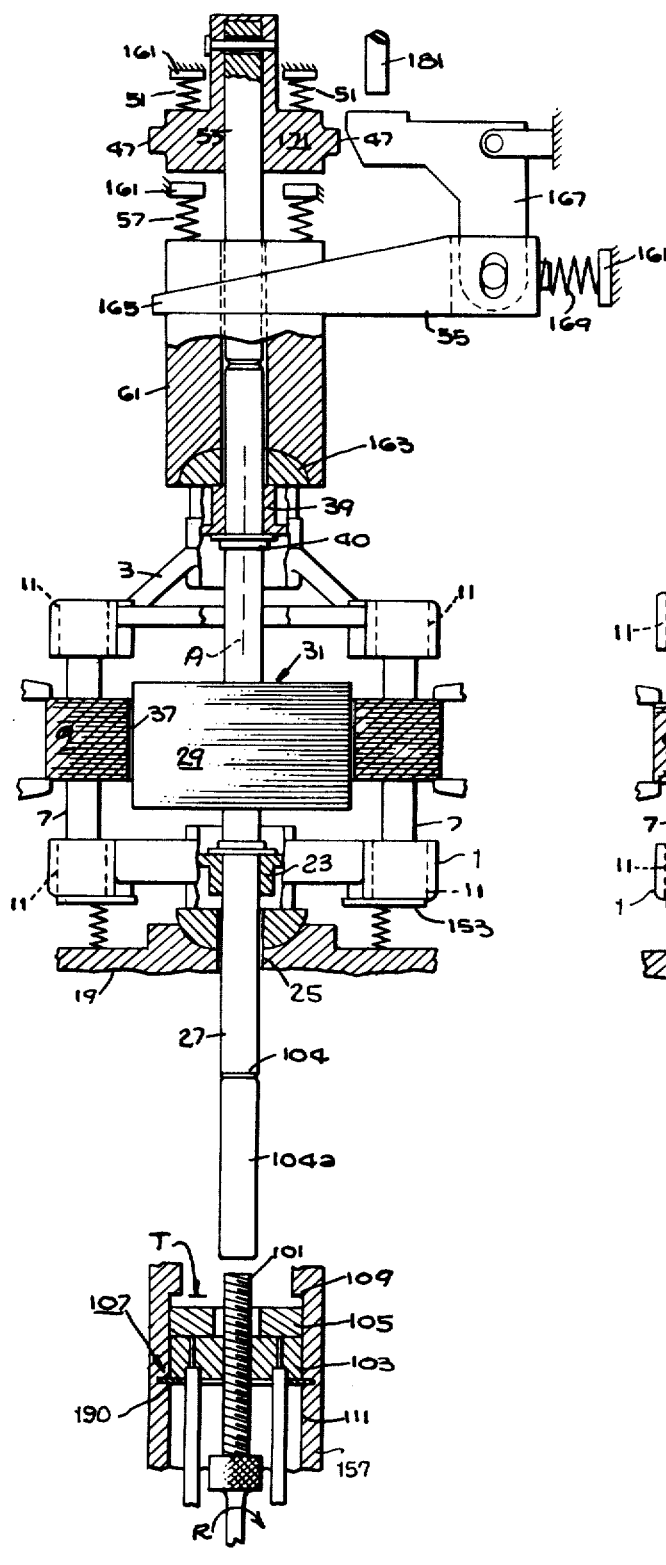
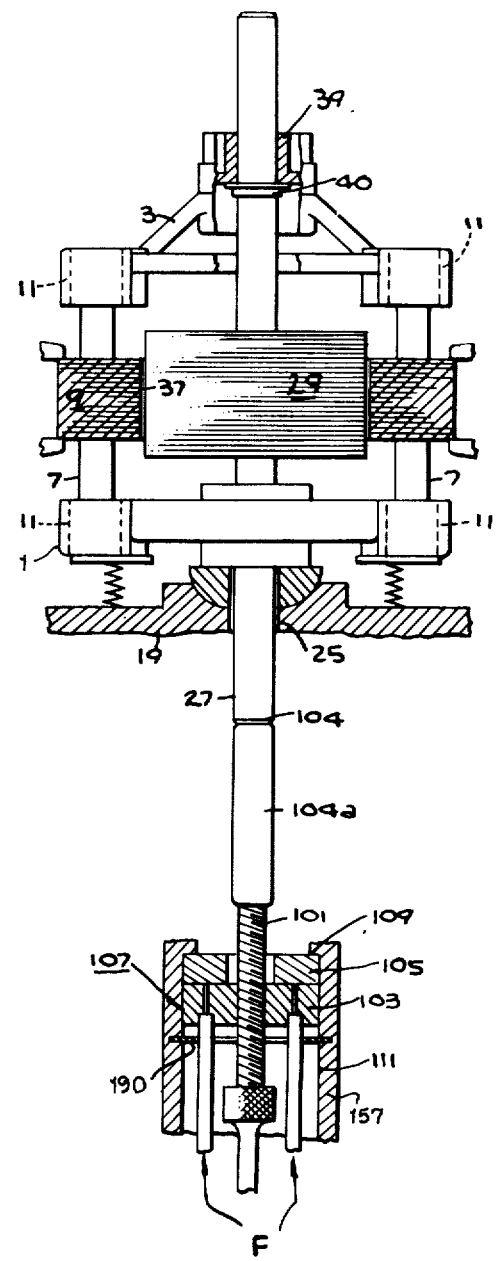

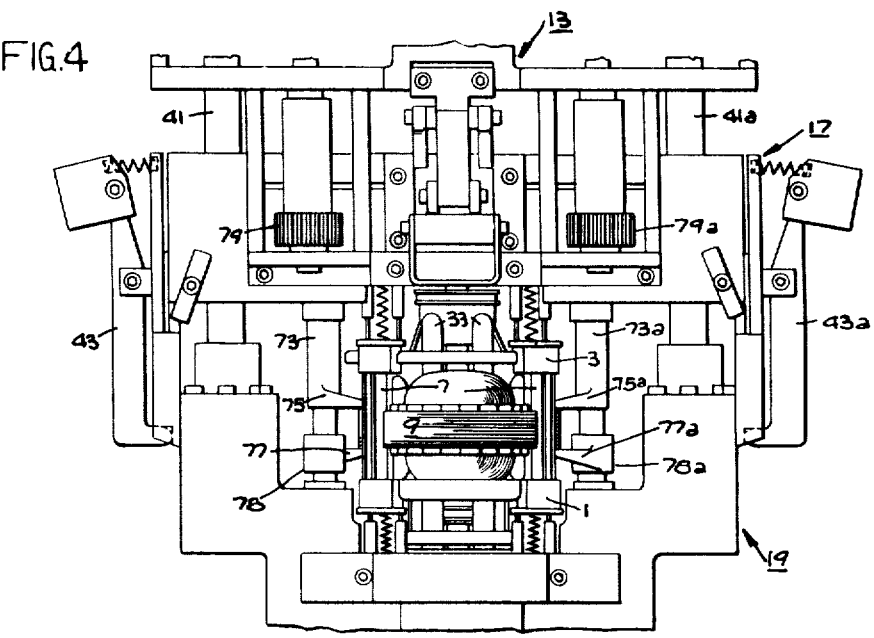
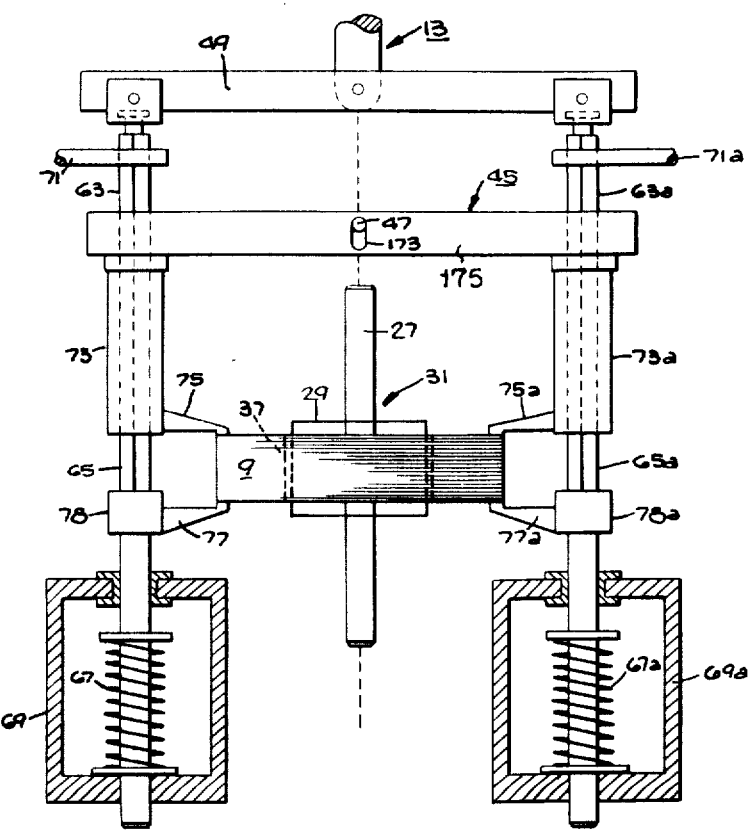

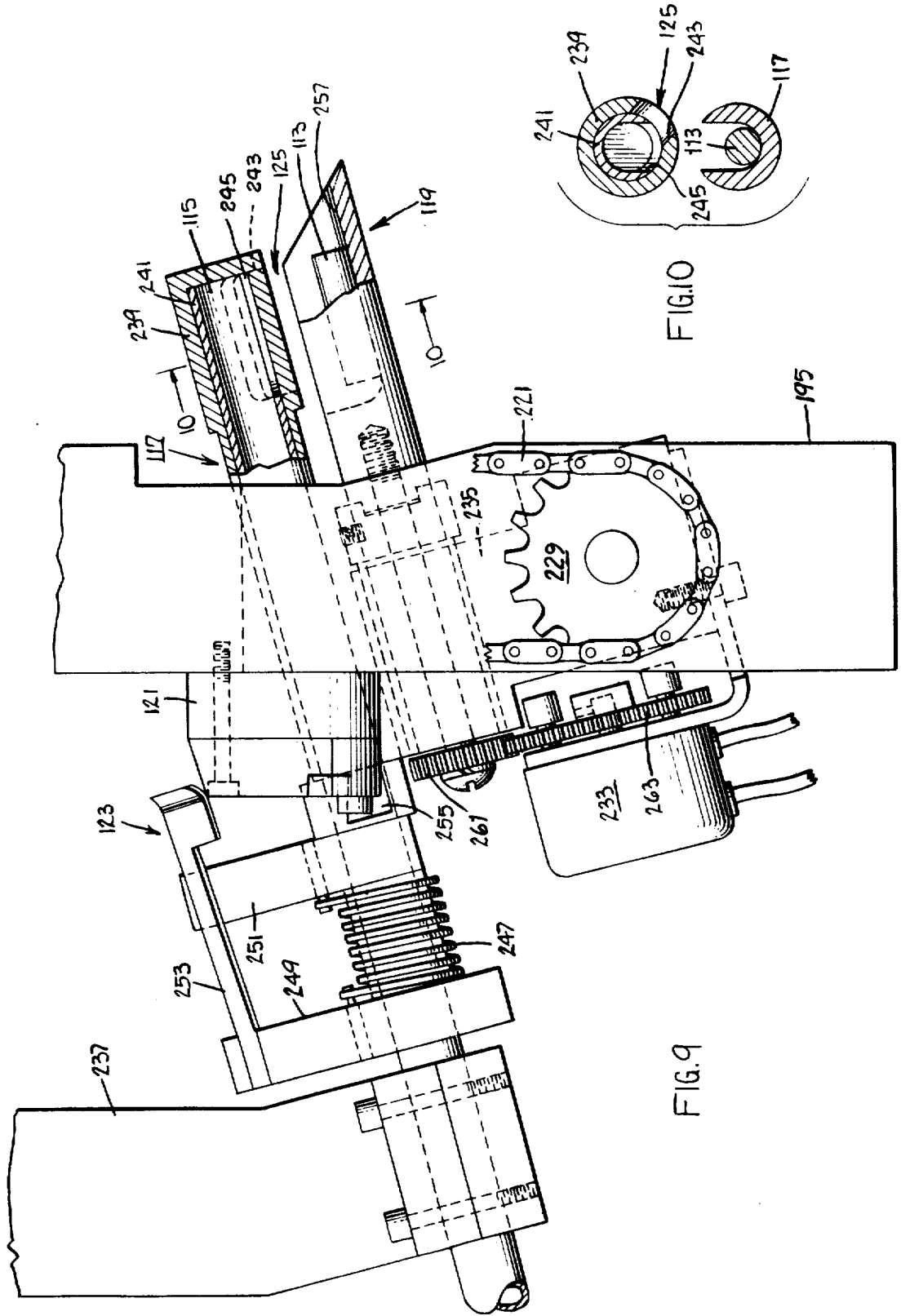

4,004,725

APPARATUS FOR ASSEMBLING COMPONENTS OF A DYNAMOELECTRIC MACHINE

RELATED PATENTS

This is a continuation of my copending application for patent Ser. No. 401,177 filed Sept. 27, 1973 and now abandoned.

FIELD OF THE INVENTION

The present invention relates generally to dynamoelectric machines and in particular to apparatus for assembling components of a dynamoelectric machine.

BACKGROUND OF THE INVENTION

In the past, various methods and apparatus were employed to effect indexing of work-pieces, such as a dynamoelectric machine for instance, between work positions at a work station and/or between a plurality of work stations for performing various manufacturing operations on the indexed work-pieces. Past mechanical indexing apparatus for effecting a "two stop" or 180° index was usually accomplished by oscillation instead of indexing and consists of a simple rack and pinion mechanism driven by a servo motor, such as an air or hydraulic actuating cylinder or the like; however, one of the disadvantageous or undesirable features of this type of apparatus is believed to be that it produced an output movement having very poor acceleration and velocity characteristics. For instance, after the initial acceleration of the actuating cylinder during its stroke to its speed setting, the actuating cylinder thereafter was moved at a constant velocity for most of the rest of its stroke, and at the end of its stroke, the actuating cylinder was stopped by an internal cushioning device and/or an external dash pot arrangement prior to the reversal of the stroke. Furthermore, it often happened that the driven load on the output shaft of the actuating cylinder was quite large in relation to the actuating cylinder size; and such out-sized load thereupon became the driver, i.e., once it was in motion, requiring the internal cushioning device and/or external dash pot arrangement to stop not just the force of the actuating cylinder rod but the entire load being index which, of course, was also a disadvantageous or undesirable feature. In addition to the foregoing, another disadvantageous or undesirable feature of the past mechanical indexing apparatus is believed to be that minor variations in the driven load thereof, such as differing fixtures, part sizes, frictions, etc., resulted in irratic output motion of the actuating cylinder shaft which was especially noticeable or prevalent at the end of its stroke. Of course, efforts have been made in the past to overcome these deficiencies by increasing the size of the actuating cylinder and component parts associated therewith as well as increasing the stroke of the actuating cylinder; however, these changes merely resulted in a rather bulky apparatus without appreciably correcting or affecting the aforementioned undesirable uniform velocity with high accelerations and decelerations of the output shaft. It may also be noted that geneva gear mechanisms are not capable of indexing an output shaft 180°.

U.S. Pat. Nos. 65,981, 595,732 and 3,459,056 each concern the conversion of non-harmonic acceleration of substantially linear reciprocal movement into generally harmonic acceleration; however, while these patents may have at least some advantageous features, one of the disadvantageous or undesirable features thereof is believed to be that each requires dual inputs or drivers to effect the aforementioned conversion as well as a multiplicity linkage which are not only costly but also difficult to adjust and to maintain in the proper adjustment.

Also in the past, several different methods of assembling dynamoelectric machines have been utilized to effect proper radial and axial alignment of the rotatable assembly, stator and end frames of the dynamoelectric machine. For example, through-bolts have been used to interconnect the stator and end plates of a dynamoelectric machine with the rotatable assembly thereof journaled in the end plates; however, one of the disadvantageous or undesirable features of this construction is believed to be that rather close tolerances were required to attain proper alignment of the dynamoelectric machine components, and maintaining close tolerances manifestly results in increased machining and assembly costs of manufacture. Another past method of assembling dynamoelectric machines was to employ an oversized dummy rotatable assembly to effect the necessary alignment between the stator and end plate and thereafter substitute an actual rotatable assembly for the dummy rotatable assembly; however, one of the disadvantageous or undesirable features of this method of construction is believed to be that it was limited to "unit bearing" type machines wherein the rotatable assembly is supported in only one end frame. As a result, this method was unavailable for use in the greater majority of dynamoelectric machines wherein the rotatable assembly is supported in oppositely disposed end frames.

In U.S. Pat. No. 3,165,816 shims were disposed between the rotatable assembly and stator to effect proper radial alignment therebetween, and a rocker arm mechanism was employed to maintain the rotatable assembly and stator in their proper assembled positions while an adhesive such as thermosetting resin, was applied to band together the stator and opposite end plates in which the rotatable assembly was journaled.

In U.S. Pat. No. 3,705,994 another method of assembling dynamoelectric machines is disclosed wherein the opposite end frames thereof were welded to beams carried by the stator while the rotatable assembly was supported therein; however, one of the disadvantageous or undesirable features of this method is believed to be that the welds themselves, upon cooling, manifestly created stresses which tend to effect misalignment, as well known to the art.

In U.S. Pat. No. 2,892,225, there is disclosed a method of casting metal wherein molten metal in predetermined amounts are delivered directly from a source or furnace therefor to a casting ladle disposed adjacent to a mold, and the molten metal is then poured from the ladle into the mold. One of the disadvantageous or undesirable features of this past method of casting metal is believed to be that it was necessary not only to maintain the molten metal in the furnace at a predetermined temperature proper for the casting operations but it was also necessary to maintain such predetermined temperature of the molten metal as it was delivered from the source to the casting ladle. Since some metals, such as zinc, lead, aluminum or the like and various alloys thereof cool or solidify at a rather rapid rate, the time factor involved in delivering such molten metal from the source thereof to the casting ladle and casting it would, of course, be critical and relatively short.

SUMMARY OF THE INVENTION

Among the several objects of the present invention may be noted the provision of apparatus for assembling components of a dynamoelectric machine which overcomes the above discussed disadvantageous features, as well as others, of the prior art; the provision of such apparatus in which a hardenable material is automatically provided and flowed between dynamoelectric machine components so as to form rigid ties therebetween; the provision of such apparatus wherein the dynamoelectric machine components are inverted while held in assembly positions to accommodate the provision and flowing of the hardenable material so as to form the rigid tie between at least two dynamoelectric machine components subsequent to the formation of the rigid tie between another dynamoelectric machine component and one of the two dynamoelectric machine components; the provision of such apparatus wherein the dynamoelectric machine components are rotatably indexed or inverted with generally sinusoidal acceleration to an indexed position while being held in the assembly position thereof; the provision of such apparatus in which the components are moved to the assembly position and supported therein during the provision and flowing of the hardenable material to form the rigid ties and during the inversion of the dynamoelectric machine components; and the provision of such apparatus which is simplistic in nature so as to effect economical manufacture. These, as well as other objects and advantageous features of the present invention, will be in part apparent and in part pointed out hereinafter.

In general and in one form of the invention, there is provided apparatus for assembling a pair of opposite end frames of a dynamoelectric machine to a structural component thereof disposed within means respectively in the end frames for receiving the structural component. The apparatus has means for moving at least one of the structural component and the end frames to an assembly position with the structural component disposed within the receiving means of the end frames and for supporting the structural component and the end frames in the assembly position. Means is utilized for providing a hardenable material in the receiving means adapted to be flowed therein so as to form rigid ties between the end frames and the structural component upon the hardening of the hardenable material in the receiving means as the structural component and the end frames are supported in the assembly position thereof by the moving and supporting means. Means is also provided for inverting the moving and supporting means with the end frames and structural component supported therein in the assembly position so as to dispose one of the end frames in a position wherein the hardenable material may be provided therein to form the rigid tie between the one end frame and the structural component subsequent to the formation of the rigid tie between the other of the end frames and the structural component.

BRIEF DESCRIPTION OF THE DRAWINGS

FIG. 2 is a schematic view of the apparatus of FIG. 1;

FIG. 3 is a schematic view illustrating rocker arms of the apparatus of FIG. 1 for effecting proper alignment of the dynamoelectric machine components;

FIG. 4 is a rear elevational view of the apparatus of FIG. 1;

FIG. 8 is a schematic view of the apparatus included of FIG. 1 illustrating means in the apparatus of FIG. 1 for introducing end-play between the dynamoelectric machine components;

FIG. 9 is a side elevational view, partly in cross-section illustrating a metal recaptacle and a ladle of the apparatus of FIGS. 11–14;

FIG. 10 is a sectional view taken along line 10—10 of FIG. 9;

Corresponding reference characters indicate corresponding parts throughout the several views of the drawings.

The following exemplifications set out herein illustrate the preferred embodiments of the invention in one form thereof, and such exemplifications are not to be viewed as limiting, in any manner, the scope of the invention.

DETAILED DESCRIPTION OF THE PREFERRED EMBODIMENT

Figure 1:
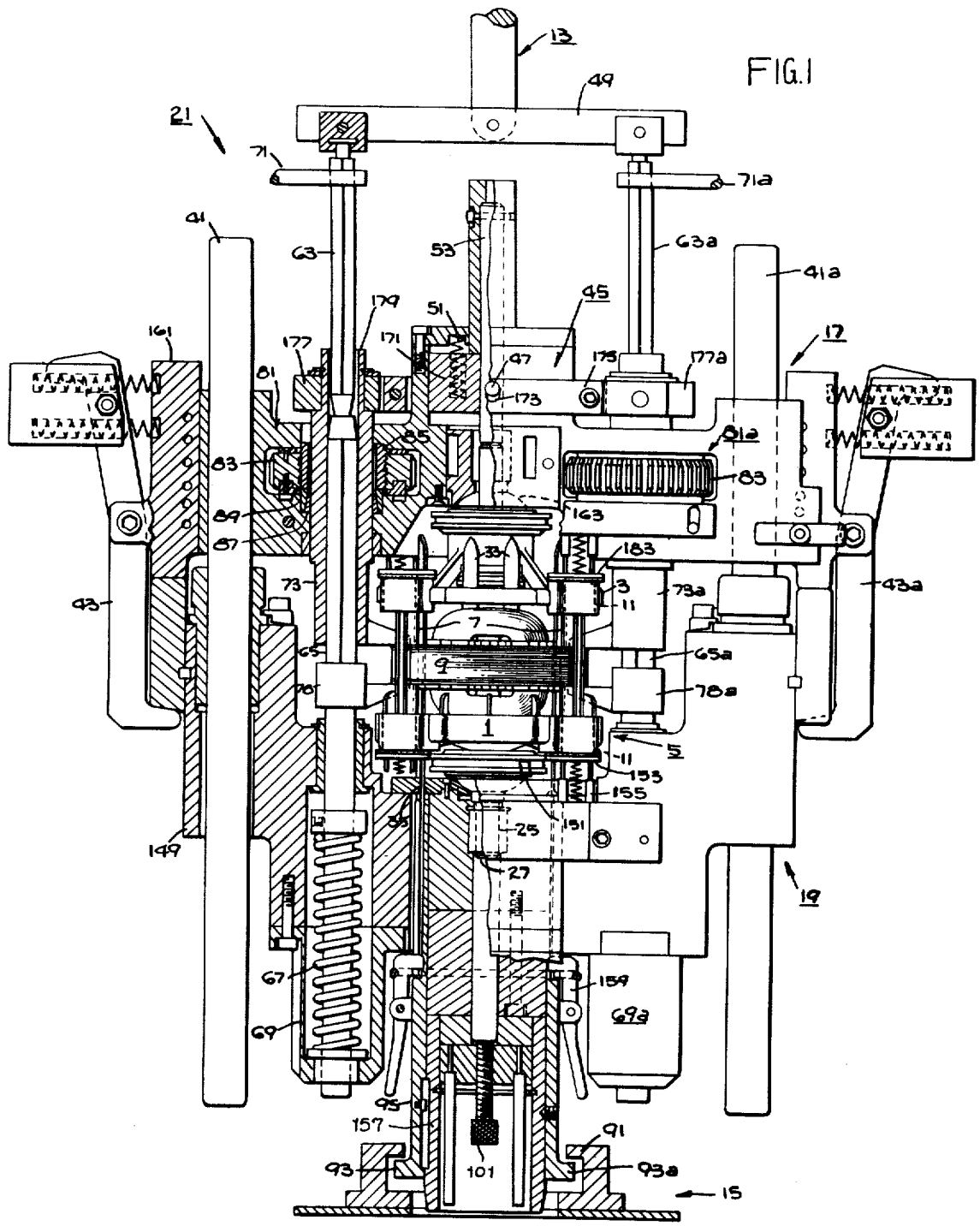
FIG. 1 is an elevational view, partially in cross-section, of apparatus in one form of the present invention for assembling components of a dynamoelectric machine.

Referring now to the drawings in general, a method is illustrated for attaching a pair of structural components, such as opposite end frames 1, 3, of a dynamoelectric machine 5 to a structural component thereof, such as a plurality of beams 7 of a stator or stationary assembly 9, which are predeterminately positioned with the end frames for assembly within receiving means, such as a plurality of sockets 11, or the like respectively provided in the end frames, as shown in FIGS. 1 and 2. As shown in FIGS. 9-12, a flowable or hardenable material, such as a molten metal in one exemplification of the invention, is introduced into receiving means or sockets 11 of one of end frames 1, 3 for solidifying or hardening thereby to form a rigid tie between the one end frame and the structural component or beam 7 in their respective predetermined positions, and the end frames and structural component are simultaneously inverted upon the solidifying of the molten metal for disposing receiving means or sockets 11 of the other of end frames 1, 3 in position for introducing metal thereinto.

More particularly, there is shown in FIGS. 1 and 2, a pair of upper and lower slide mechanisms 13, 15 and a pair of upper and lower assembly fixtures 17, 19 which generally constitute an apparatus or means for moving the components of dynamoelectric machine 5 to assembly positions and supporting them therein, indicated at 21, which moving and supporting means 21 located at a work-piece loading station (not shown) of an automatic motor assembly machine or apparatus, and fixtures 17, 19 are selectively indexed or rotatably movable generally 180° in a horizontal plane to a casting station (not shown) wherein the fixtures are also selectively indexed or rotatably movable generally 180° in a vertical plane to an inverted position thereby to permit the selective introduction of molten metal into sockets 11 of both upper and lower end frames 1, 3. With apparatus 21 positioned at the work loading station of the automatic motor assembly machine, lower end frame 1 is initially placed in a predetermined position on lower fixture 19, and a bearing means 23 of the lower end frame is disposed over a locating or referencing means, such as an aperture or shaft receiving hole 25 in the lower fixture. A shaft 27 and rotor 29 of dynamoelectric machine 5 generally constitute a rotatable assembly 31, and the shaft has its lower end portion inserted through bearing means 23 for journaling engagement therewith and into locating engagement with locating aperture 25. In this manner, rotatable assembly 31 is positively located relative to lower end plate 1 thereby to predeterminately position or locate an axis A of the rotatable assembly in a substantially perpendicular position. With rotatable assembly 31 and lower end frame 1 disposed in this predetermined position on lower fixture 19, shim means, such as a plurality of shim strips 33, are protractively moved upwardly through a plurality of circularly disposed slots 35 provided therefor in the lower fixture to shimming positions disposed about the periphery of rotor 29. A bore 37 of stator 9 is manually positioned or placed about the periphery of rotor 29 by an operator with the lower end portions of beams 7 disposed within sockets 11, and in this manner, shims 33 are interposed in shimming engagement between the rotor periphery and the stator bore to predetermine the air gap therebetween upon the movement of the dynamoelectric machine components to their final assembly positions, as discussed hereinafter. For the purpose of this discussion, it may be assumed that stator 9 is out-of-square having relatively high and low tolerance portions or surfaces on the upper and lower end or end faces thereof, respectively. A bearing means 39 which is provided in upper end frame 3 is placed over the upper or opposite end portion of shaft 27 for journaling engagement therwith with sockets 11 of upper end frame 3 received about the upper end portion of stator beams 7. Bearing 39 is disposed in engagement with a trust washer 40 or the like which is fixedly positioned on the upper end portion of shaft 27.

Upper fixture 17 carries a pair of guide shafts or rods 41, 41a which suitably journaled in lower fixture 15, and actuation of upper slide 13 by suitable means (not shown) moves the upper fixture downwardly into abutment with the lower fixture. A pair of fixture locking means or levers 43, 43a, which are pivotally and resiliently mounted on upper fixture 17, are swung or resiliently urged inwardly into locking engagement with a mating part of lower fixture 15 thereby to secure the upper and lower fixtures together against displacement in a closed position thereof.

Referring now also to FIG. 3, when upper and lower fixtures 17, 19 are so locked together, a rocker arm mechanism 45, which is provided in upper fixture 17, is movable therewith to a position pivotal about its trunnions 47, and another rocker arm mechanism 49, which forms a portion of upper slide 13, is in its pivotal position when the upper slide drives the upper fixture to its position in locking engagement with the lower fixture. When fixture rocker arm 45 is in its pivotal position, the compressive forces of a plurality of springs 51 urge a plunger or shaft extension 53 carried by the fixture rocker arm into biasing engagement with the upper end of shaft 27 urging it and lower end plate 1 downwardly thereby to engage the lower end plate with lower fixture 19. Further, during movement of slide rocker arm 49 to its pivotal position, upper slide 13 actuates a slide or wedge device 55 carried in upper fixture 9 thereby to effect the release of a plurality of springs 57 therein for urging a wedge block 61 downwardly into biasing engagement with upper end frame 3 to bias it into engagement with rotatable assembly 31. In this manner, when both fixture and slide rocker arms 45, 49 are in their pivotal positions, rotatable assembly 31 and end frames 1, 3 are resiliently urged together or locked in predetermined positions by the compressive forces of springs 51, 57, as further discussed hereinafter.

During movement of slide rocker arm 49 to its pivotal position, a pair of generally square, laterally spaced arms or rods 63, 63a thereof abut and conjointly drive another pair of generally square, laterally spaced rods 65, 65a downwardly against the compressive forces of a pair of springs 67, 67a biased between the lower ends of rods 65, 65a and a wall of a pair of spring chambers 69, 69a provided in lower fixture 11 as also shown in FIG. 3. A pair of rotating levers 71, 71a are actuated by suitable means (not shown) to controllably effect rotation of rods 63, 63a thereby to drivingly rotate a pair of sleeves 73, 73a which are pivotally mounted on fixture rocker arm 45 and slidably mounted in upper fixture 17, and in turn, sleeves 73, 73a rotatably drive rods 65, 65a. In this manner, a pair of stopping means, such as a pair of upper fingers or stops 75, 75a, and a pair of clamping means, such as a pair of lower fingers or clamps 77, 77a, which are fixedly secured to sleeve 73, 73a and rods 65, 65a, respectively, are rotated inwardly into juxtaposition with the upper and lower end or end faces of stator 9. Clamps 77, 77a are integral with a pair of collars 78, 78a which are fixedly connected with rods 65, 65a by suitable means (not shown), and the collars are normally urged by springs 67, 67a into engagement with sleeves 73, 73a.

At this time, upper slide 13 is retracted slightly upwardly thereby permitting the compressive forces of springs 67, 67a to conjointly move fixture rods 65, 65a upwardly in following engagement with slide rods 63, 63a to drivingly engage clamps 77, 77a with the lower end of stator 9. Since stator 9 is out-of-square, as previously mentioned, both the upper and lower ends thereof have high and low portions or surfaces thereon; therefore, one of clamps 77, 77a engages the stator lower end high portion prior to the engagement of the other of clamps 77, 77a with the stator lower end low portion. Assuming arguendo that clamp 77 engages the stator lower end high portion, further movement of the clamp is resisted, and clamp 77a is then movable relative thereto in response to the compressive force of spring 67a into engagement with the stator lower end low portion. Such relative movement of clamp 77a conjointly drives rods 65a and 63a upwardly to pivot slide rocker arm 49, and in this manner, pivoting of the slide rocker arm allows clamp 77a to move upwardly relative to clamp 77.

When clamps 77, 77a are engaged with the lower end of stator 9, as above-described, springs 67, 67a are again effective to cause further conjoint upward movement of the clamps thereby to conjointly drive the stator upwardly on shims 33 moving stator bore 37 generally coaxially along axis A of rotatable assembly 31 for engaging the upper end of the stator with stops 75, 75a. Since stator 9 is out-of-square, one of stops 75, 75a will be engaged by the stator upper end high portion prior to the engagement of the other of stops 75, 75a with the stator upper end low portion. Assuming agruendo that stator upper end high portion first engages stop 75, it is then movable upwardly in response to the compressive force of springs 67, 67a acting on stator 9 relative to stop 75a which, in turn, causes slide rocker arm 49 to pivot thereby moving stop 75a downwardly to effect engagement with the stator upper end low portion. With stops 75, 75a so pivoted slide rocker arm 49 into respective engagement with the high and low portions on the upper end of stator 9, further conjoint movement of clamps 77, 77a and the stator is arrested, and the relative positions of the stops define the setting or assembly position of the stator with respect to rotatable assembly 31 and end frames 1, 3. It may be noted that stator 9 has been moved by clamp 77, 77a substantially coaxially of rotatable assembly 31 along axis A thereof to the assembly position of the stator without canting or skewing the stator with respect to axis A of the rotatable assembly.

With stator 9 in its assembly position, a pair of driving gears 79, 79a provided on upper slide 13, as shown in FIG. 4, are drivingly engaged with means, such as a pair of locking drives 81, 81a, as shown in FIG. 1, for locking the stator in its assembly position. For the sake of simplicity only locking device 81 is shown in cross-section, but the corresponding parts of locking device 81a is described hereinafter and designated by the letter a. Locking devices 81, 81a generally comprise a pair of gears 83, 83a rotatably supported in upper fixture 17 and driven by slide gears 79, 79a upon actuation thereof by suitable means (not shown). When driven gears 83, 83a are so rotated, they drive annular threaded screw devices 85, 85a threadedly engaged therewith for actuating a respective pair of male and female or annular wedge members 87, 89 and 87a, 89a between releasing positions and tightened or locking positions engaged between upper fixture 17 and the peripheries of sleeves 73, 73a thereby to obviate further pivotal or rotational movement of sleeves 73, 73a and fixture rocker arm 45 for locking stator 9 in its assembly position.

Having locked stator 9 in its assembly position against further movement in response to the compressive forces of springs 67, 67a, upper slide 13 is now retracted by suitable means (not shown) upwardly to its original or at-rest position disengaging rods 63, 63a of rocker arm device 49 from upper fixture 11 and at the same time permitting wedge 55 (FIG. 2) to return to its original position in engagement with wedge block 61. Lower slide 15 is initially rotated to a position disengaging a bayonet means 91 thereof from cooperating abutment means, such as a pair of opposite flanges 93, 93a on a generally cylindric shim actuating member 95, and thereafter moved downwardly to its original or at-rest position by suitable actuating means (not shown). When lower slide 15 is in its original position, fixture 17, 19 may be selectively moved to the casting station of the automatic motor assembly machine (not shown), as previously mentioned, for insertion of a predetermined amount of end-play between rotatable assembly 31 and upper and lower end frames 1, 3.

Assuming now that fixture 17, 19 has been translated to the casting station of the automatic motor assembly machine (not shown), sensing or locating means, such as a screw 101, is rotated by means of a torque limiting device, such as an over-running or slip clutch mechanism of the like (not shown) but represented by the rotational arrow R in FIG. 2, connected therewith, or if desired, such torque limiting device may be incorporated into the screw. Rotation of screw 101 effects threaded movement thereof through and relative to a nut 103 until the screw abuttingly engages a free end 104 of shaft 27 or a spacer 104a engaged therewith, if desired, thereby to sense or locate the position of the shaft free end, and upon such abutting engagement, the compressive force of springs 51, 57 acting downwardly on shaft 27, as previously mentioned, resists or opposes further upward rotational movement of the screw thereby to cause the torque limiting device to slip or run free in a manner well known in the art. Upon determining the sensed position of shaft lower or free end 104, other actuating means, such as an air or hydraulic cylinder or the like (not shown) but indicated by a force arrow F in FIG. 8, acts on nut 103 conjointly driving it, a spacer 105 carried thereby and screw 101, which generally constitute a shaft end sensing assembly 107, upwardly through a predetermined distance or travel T between the spacer and a movement limiting means, such as an abutment 109, disposed about a bore 111 in lower fixture 19 in which the shaft end sensing assembly is movable. In this manner, upward movement of shaft end sensing assembly 107 through travel T conjointly drives rotatable assembly 31 relative to lower end plate 1 from the sensed position of the lower end 104 of shaft 27 to a displaced position thereby introducing or inserting a predetermined amount of end-play, which is substantially equal to travel T, into dynamoelectric machine 5 between rotatable assembly 31 and lower end frame 1, and upper end frame 3 is conjointly movable upwardly with rotatable assembly 31 upon the introduction of the end-play, as above described.

Figure 11:
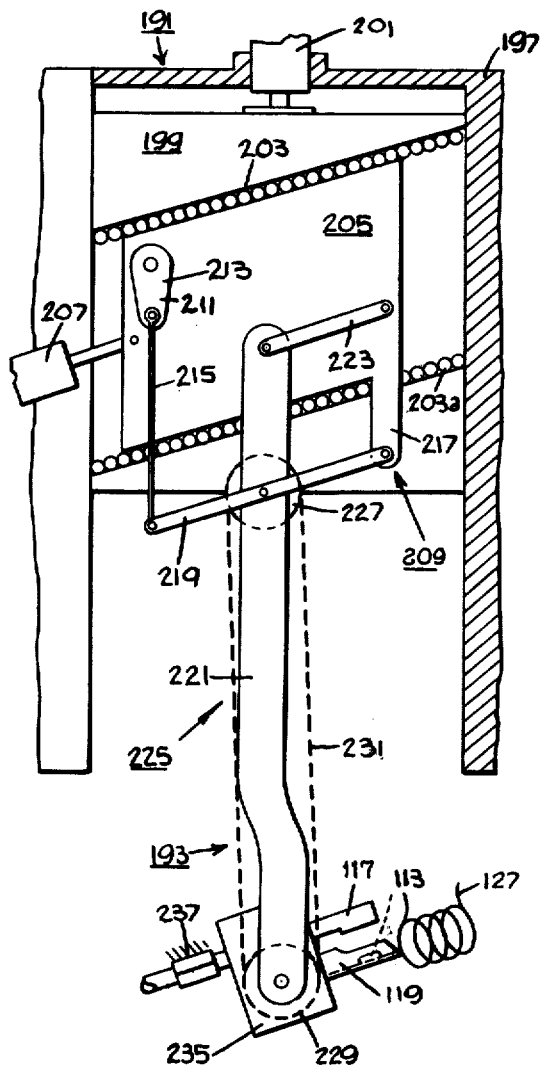
FIGS. 11–14 are schematic views illustrating a device utilized in the apparatus of FIG. 1 for establishing a rigid tie between opposite end plates and another structural component of the dynamoelectric machine.
Figure 12:
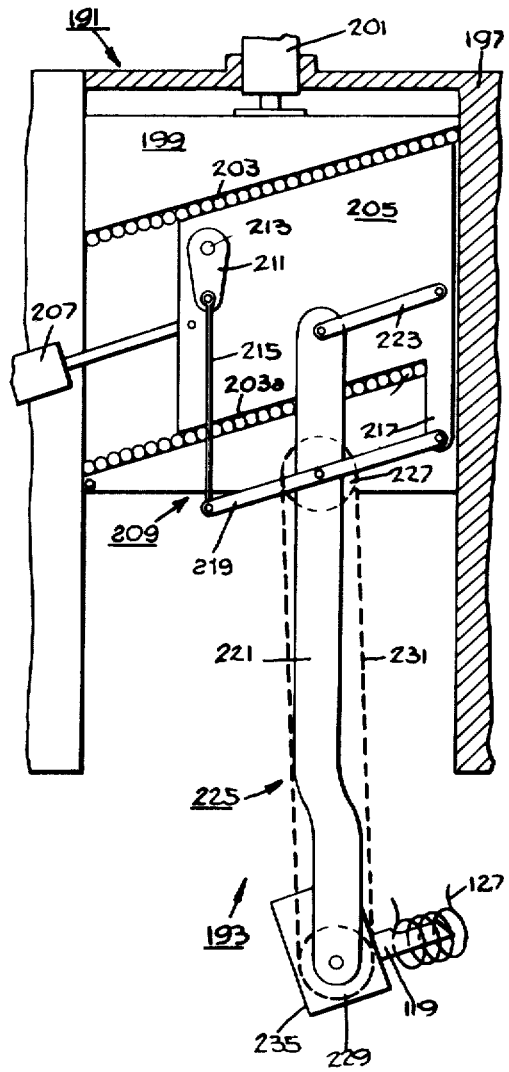
Figure 13:
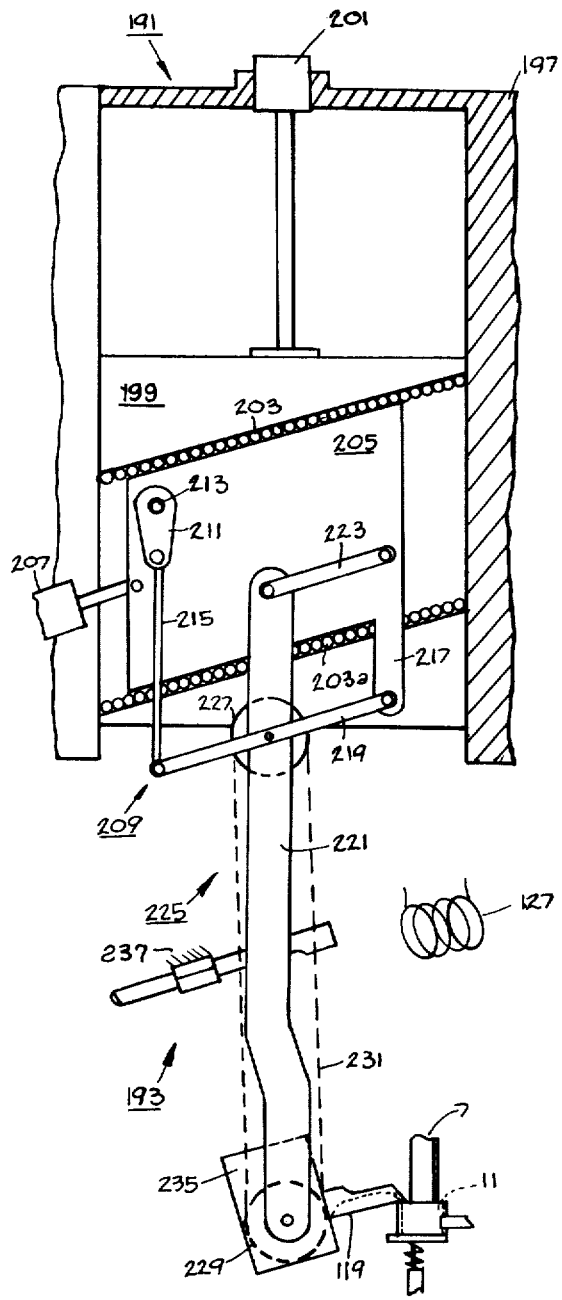
Figure 14:
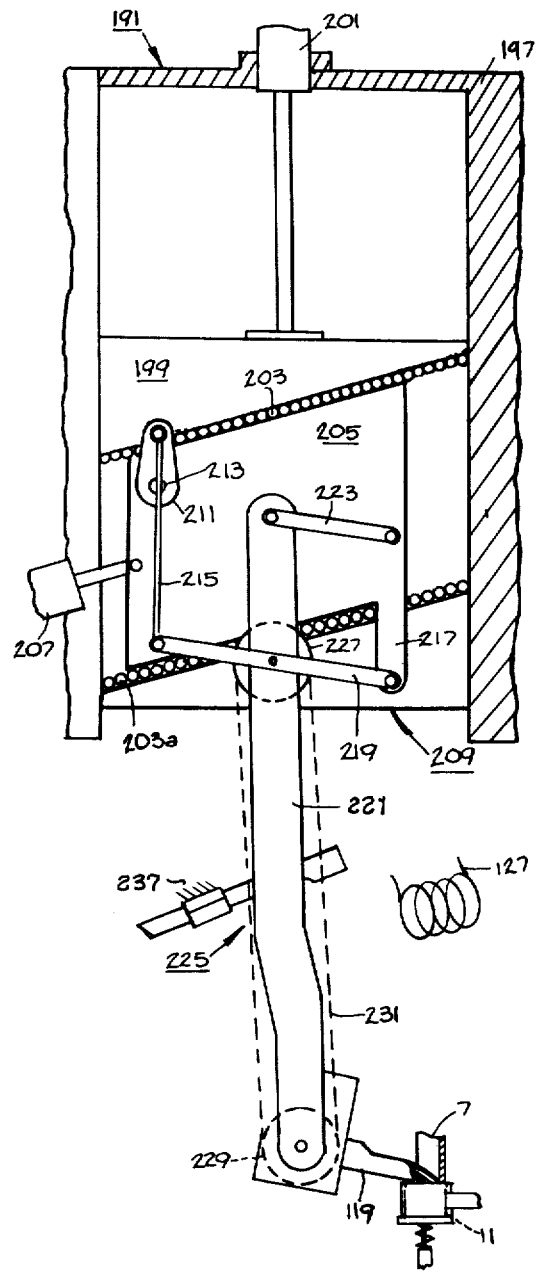

Referring now in general to FIGS. 9 and 10, means in one form of the invention is shown for providing the hardenable material in sockets 11, which hardenable material is adapted to be flowed in the sockets between beems 7 and end plates 1, 3 so as to form rigid ties therebetween upon the hardening of the hardenable material. For instance, when fixture 17, 19 having dynamoelectric maching 5 therein with its components in their assembly positions is disposed at the casting station, a pellet or slug 113 of a predetermined volume or amount of metal is supplied from a source thereof (not shown) into a chamber 115 of a pellet receiving and transfer mechanism, such as a receptacle 117. Upon upward movement of metal casting or introducing means, such as ladle 119, toward receptacle 117, a wiping block or abutment 121 wipes or engages a trigger mechanism 123 to cock or actuate it thereby to open means, such as an opening or passage 125 in the receptacle, for transferring or depositing the pellet from the chamber into the ladle. With pellet 113 transferred in its solid state from chamber 115 of receptacle 117 to ladle 119, as shown in FIG. 11, the ladle enters an RF heater 127, as shown in FIG. 12, and the metal is melted being transformed to its molten state for subsequent casting. Ladle 119 is thereafter further movable downwardly to a position juxtaposed with socket 11 of lower end frame 1 of dynamoelectric machine 5 which is predeterminately positioned in the casting station, as shown in FIG. 13, and the ladle is thereafter tipped or moved to its casting position, as shown in FIG. 14, casting or pouring the molten metal therefrom into end frame socket 11 for solidification thereby to establish a rigid tie or mechanical connection between at least a part of the end frame within the socket and the free end of beam 7 which, as previously mentioned, is disposed in its assembly position within the socket.

Figure 15:
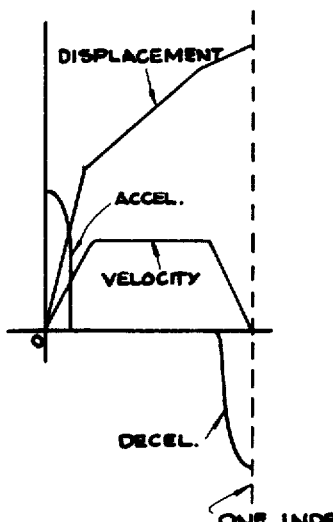
FIGS. 15 and 16 are graphical representatives illustrating non-harmonic and generally sinusoidal acceleration and velocity attained by prior art apparatus and the apparatus of this invention.
Figure 17:
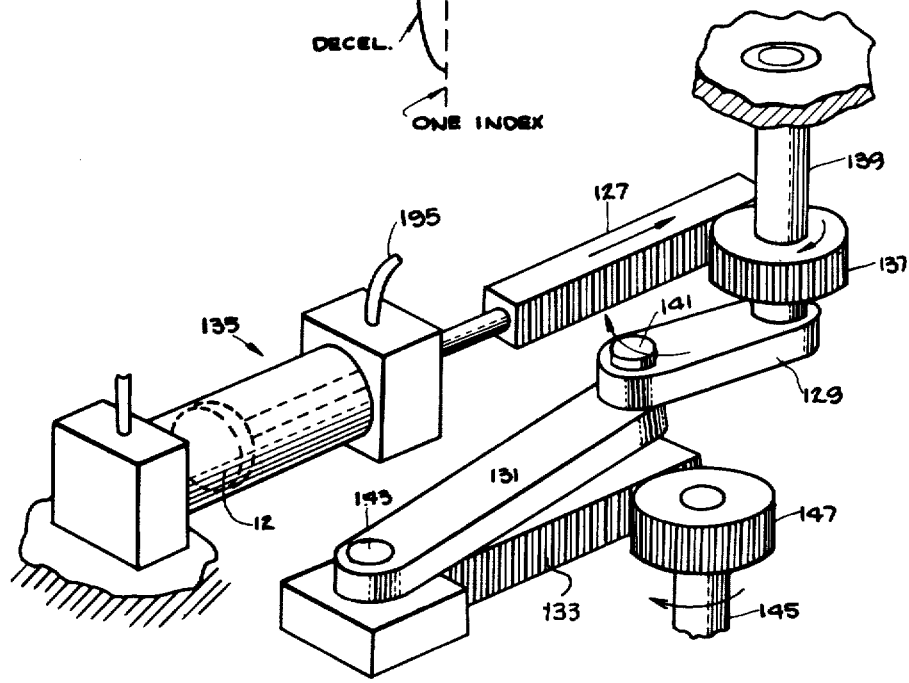
FIG. 17 is a schematic view of a mechanism utilized in the apparatus of FIG. 1 for inverting the fixture and dynamoelectric machine of FIG. 1.
Figure 16:
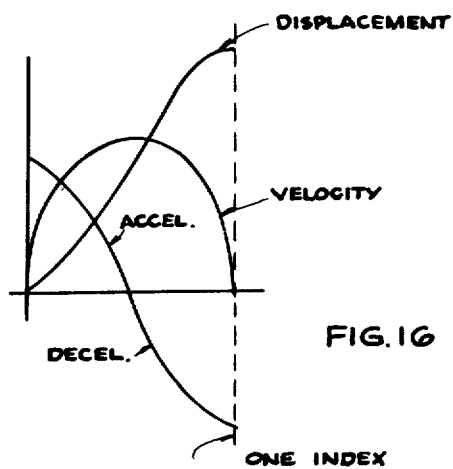

Referring now to FIG. 17, a method of converting nonharmonic acceleration of linear reciprocal motion, as illustrated in the graphical representation of FIG. 15, into generally sinusoidal acceleration, as illustrated in the graphical representation of FIG. 16, is practiced by transforming non-harmonic acceleration of the linear reciprocating motion of a driving means, such as a rack 127 or the like, into complementary motion through a predetermined arc. The complementary rotary motion is then translated or converted into the generally sinusoidal acceleration by conjointly moving an articulated means, such as a pair of articulated links 129, 131, through the predetermined arc and drivingly connecting it pivotally with a linear reciprocating driven means, such as another rack 133.

Figure 5:
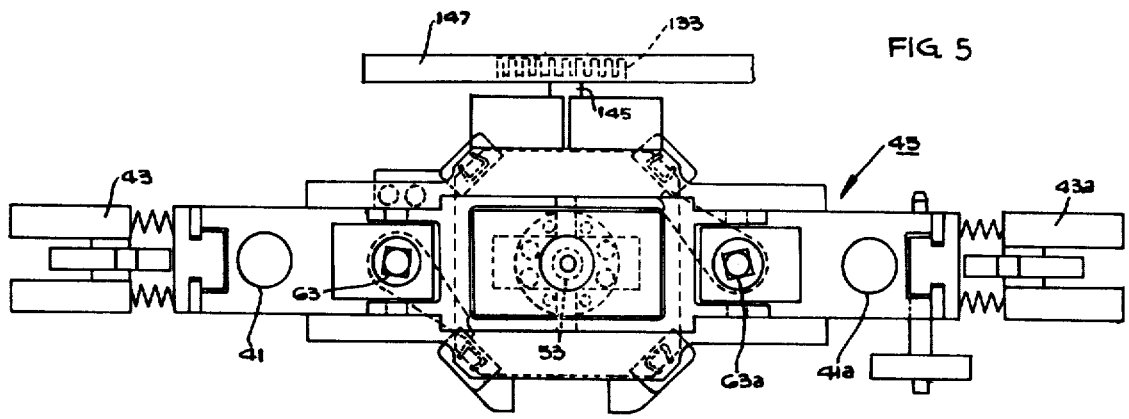
FIG. 5 is a top elevational view of the apparatus of FIG. 1 showing the rocker arm of a fixture for the apparatus and a gear and rack means for inverting the fixture.

More particularly, actuating means, such as a double-acting servo motor of the air or hydraulic type 135, is connected with rack 127 for imparting thereto reciprocal movement, and acceleration of the servo motor is of the non-harmonic type, which is well known in the art as illustrated in the graphical representation of FIG. 15 and discussed hereinafter. This non-harmonic acceleration as well as the linear reciprocating motion of the servo motor 135 is transmitted to rack 127 and transformed into complementary rotary motion through a predetermined arc of about 180° by a transforming means, such as a pinion gear 137, meshed with the rack. Articulated link 129 is on center with pinion gear 137 being connected by suitable means (not shown) with a shaft 139 of the pinion gear for concerted rotation therewith through the predetermined arc. Articulated link 131 is pivotally interconnected with articulated link 129 and rack 133 by suitable means, such as a pair of pivot pins indicated at 141, 143, respectively, and the articulation of articulated links 129, 131 in response to the rotary movement of pinion gear 137 through the predetermined arc translates the complementary non-harmonic acceleration of the rotary motion thereof into the generally sinusoidal acceleration, as illustrated in the graphical representation of FIG. 14, for effecting the substantially linearly reciprocating movement of rack 133. In this manner, the non-harmonic acceleration of the linear reciprocating motion of rack 127 is converted into generally sinusoidal acceleration for the linear reciprocating motion of rack 133. Referring now also to FIG. 5, a rotatable output shaft 145 is supported by suitable means in the automatic motor assembly machine (not shown) and connected between lower fixture 19 and another pinion or indexing gear 147 which is meshed with rack 133 and indexed thereby through an arc equivalent to the predetermined arc, i.e. about 180°. In this manner, indexing of gear 147 through the predetermined arc drives or rotates fixtures 17, 19 with generally sinusoidal acceleration to an inverted position subsequent in time to the solidifying of the molten metal cast into socket 11 of lower end frame 1 thereby to predeterminately dispose or position sockets 11 of lower end frame 3 for also receiving molten metal therein upon the re-cycling of the metal casting operation, as above described.

More particularly, and referring to FIG. 1, lower fixture 19 of apparatus 21 is provided with a frame 149, and end frame positioning means, such as a pair of clips 151, are mounted thereon and may be cammed into gripping positioning engagement lower end frame 1 when it is positioned on the fixture frame. A plurality of spring loaded, heat resistant pads 153 of asbestos or the like are disposed about slots 35 for closing the lower ends of socket 11 in lower end frame 1, and these pads are depressable by lower end frame 1 placed thereon toward engagement with abutments or stops 155 provided therefor on fixture frame 149. A guide cylinder 157 is centrally attached by suitable means to the lower end portion of fixture frame 149, and cylindric member 95 is reciprocally movable thereon for protractively and retractively moving shims 33 through their slots 35. Quick disconnect means, such as a plurality of latches 159, are pivotally mounted on cylindric member 95 for positioning engagement with shims 33 and facilitating quick-release thereof whenever it is necessary to change shims.

Upper fixture 17 is provided with a frame 161 in which guide pins 41, 41a are fixedly received, and locking arms 43, 43a are pivotally mounted on opposite ends of the fixture frame. As also schematically shown in FIG. 2, wedge block 61 is reciprocably mounted centrally of fixture frame 161, and a pivotal mounting cap 163, through which the upper end portion of dynamoelectric machine shaft 27 extends, is pivotally disposed in the lower end of the wedge block for pivoted positioning engagement with dynamoelectric machine upper end frame 3. Springs 57 are engaged between a portion of fixture frame 161 and wedge block 61 urging it downwardly toward engagement with dynamoelectric machine upper end frame 3, and wedge 55 is slidably received in the fixture frame for engagement with a cooperating surface 165 on wedge block 61. A bell crank 167 is also pivotally mounted on fixture member 161 for actuation by upper slide 13, as discussed hereinafter, and a spring or spring means 169 urges the bell crank toward resilient driving engagement with wedge 55 for selectively engaging it with wedge block surface 165 to contain the compressive forces of springs 57.

Fixture rocker arm 45 is provided with a trunnion block 171 which is vertically reciprocably movable in fixture frame 161, and shaft extension 53 is connected to the trunnion block and conjointly movable therewith for abutting engagement with the upper end of the dynamoelectric machine shaft 27 FIGS. 1 and 2. Springs 51 are engaged between a portion of fixture frame 161 and trunnion block 171 for urging shaft extension 53 toward engagement with the upper end of shaft 27, and opposite trunnions 47 provided on the trunnion block extend laterally through opposite elongate pivot slots 173 in a pivotal or rockable yoke or arm member 175. A pair of pivotal connecting members 177, 177a are pivotally connected to yoke 175 adjacent its opposite ends, and the upper ends of sleeves 73, 73a extend through the connecting members if fixed engagement therewith. Sleeves 73, 73a are journaled in fixture frame 161 for generally vertically reciprocal movement, and a pair of generally square bores 179, 179a extend through the sleeves for receiving fixture rods 65, 65a and slide rods 63, 63a which have a cross-sectional configuration generally complementary to that of the sleeve bores wherein the sleeves may also be drivingly rotated in the fixture frame and connecting members 177, 177a. Driven gears 83, 83a are rotatably mounted in fixture frame 161 for driving screw members 85, 85a which are disposed about the periphery of sleeves 73, 73a so as to drive male and female wedges 87, 89 and 87a, 89a for locking engagement between a portion of the fixture frame and the periphery of the sleeves.

Figure 6:
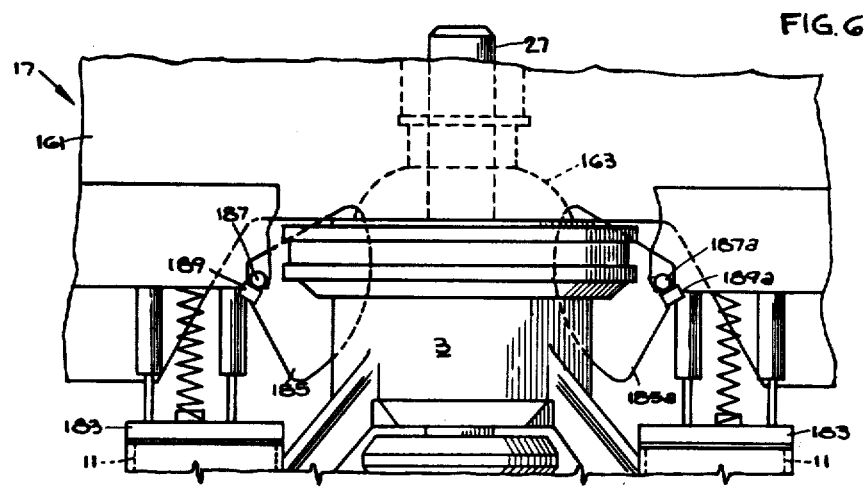
FIGS. 6 and 7 are schematic fragmentary views showing the positions of upper end frames positioning cams in both the normal and inverted positions of the fixture of FIG. 1.

When upper slide 13 is in its raised or at-rest position and wedge 55 contains the forces of springs 57, springs 67, 67a urge mounting collars 78, 78a upwardly into engagement with the lower ends of sleeves 73, 73a thereby to move the sleeves and yoke 175 upwardly. This upward movement of yoke 175 engages the bottom portion of elongate slots 173 with trunnions 47 of trunnion block 171 to effect conjoint movement thereof upwardly toward a raised, at rest or non-pivoting position for caging the forces of springs 51 and disengaging plunger 53 from the upper end of dynamoelectric machine shaft 27. A push pin 181 (FIG. 2) is provided on upper slide 13 for engagement with bell crank 167, and when the upper slide is in its raised position disassociating the plunger from the bell crank, bell crank spring 169 urges wedge 55 toward engagement with wedge block surface 165 to contain the forces of springs 57. Heat resistant pads 183 of asbestos or the like are carried on fixture frame 161 for engagement with upper end frame 3 about sockets 11 to close one end thereof, as shown in FIG. 1, and holding means, such as a pair of swing weights 185, 185a, are pivotally mounted on a pair of shafts or pins 187, 187a for engaging a pair of abutments 189, 189a on the swing weights with upper end frame 3 when it is in its inverted position, as described hereinafter and shown in FIGS. 6 and 7. Swing weights 185, 185a are disassociated from upper end frame 3 when fixtures 17, 19 is in its upright position, as shown in FIG. 6.

As previously mentioned, screw 101, nut 103 and spacer 105 generally constitute shaft end sensing assembly 107, and the screw is driven by a torque limiting device, such as an over-running or slip clutch mechanism or the like (not shown) but represented by the rotational arrow R in FIG. 2; however, if desired, such torque limiting device may be incorporated into the head of the screw, as well known in the art. Shaft end sensing assembly 107 is movably mounted in bore 111 provided in the lower end of cylinder 157 attached to frame 149 of lower fixture 19, and opposed abutments or seats 109, 190 are provided on the cylinder about the bore thereof for abutment or movement limiting engagement with nut 103 and spacer 105 respectively. Nut 103, in which screw 101 is threadedly received for engaging the lower end of shaft extension to sense the position thereof relative to end frame 1, is normally positioned in seating or abutting engagement with lower abutment 190, and the predetermined amount of end-play for introduction into dynamoelectric machine 1 is defined by travel T between spacer 105 and upper abutment 109.

Referring now to FIGS. 9–15, there is also shown an apparatus 191 for attaching opposite end frames 1, 3 of dynamoelectric machine 5 to structural component 7 thereof predeterminately positioned in position for assembly within receiving means 11 therefor respectively provided in the end frames. Apparatus 191 comprises means, such as the above described casting apparatus 193, (FIGS. 11–14) for introducing molten metal into receiving means 11 for respectively forming rigid ties between end frames 1, 3 and structural component 7 of dynamoelectric machine 5 thereby to maintain them in their predetermined assembly positions, as discussed hereinafter, and means, such as apparatus 195 (FIG. 17) which converts non-harmonic acceleration of substantially linearly reciprocal motion into generally sinusoidal acceleration, as described hereinbefore with respect to FIG. 15, for simultaneously inverting the end frames and the structural component so as to dispose the receiving means of one of the end frames in position to receive the molten metal from the introducing means subsequent to the solidification of the molten metal introduced into the receiving means of the other of the end frames.

At the casting station of the automatic motor assembly machine (not shown), a housing 197 is provided in which a block or guide 199 is reciprocably movable by suitable actuating means therefor, such as a double-acting air cylinder 201 or the like, as shown in FIGS. 11–14. Conveyor means, such as parallel runs or races of rollers or bearings 203, 203a, are provided in guide 199 extending therethrough at a predetermined angle, and a shuttle or block 205 is reciprocably movable on rollers 203, 203a by suitable actuating means, such as another double-acting air cylinder 207 or the like.

Linkage assembly 209 comprises a crank 211 having one end rotatably connected at 213 to shuttle 205 while side linkage or arm 215 is pivotably connected with the other end of the crank, and another side linkage or arm 217 extends integrally from the lower end of the shuttle. A cross-link 219 is pivotally interconnected between the distal ends of side links 215, 217 and a support arm 221 for ladle 119 is pivotally mounted on said cross-link adjacent the mid-portion thereof. A connecting link 223 is pivotally connected between the upper end of support arm 221 and the shuttle 205 being generally parallel with cross-link 219. A drive means, indicated generally at 225, for driving ladle 119 is provided with upper and lower sprockets 227, 229 rotatably mounted on support arm 221, and a drive chain 231 is connected or run about the sprockets, said upper sprocket being drivenly connected with cross-link 219 and rotatable therewith about support arm 221.

Referring now also to FIGS. 9 and 10, ladle 119 and a rotary solenoid 233 for effecting inversion thereof, as discussed hereinafter, are carried on a mounting means 235 which is interconnected by suitable means well known in the art (not shown) for pivotal movement with lower sprocket 229 for conjoint rotation therewith.

Receptacle 117 is mounted at 237 on a stationary part of the automatic motor assembly machine (not shown) and provided with a pair of concentric tubes 239, 241 through which the slug or pellet 113 is supplied for entry into pellet chamber 115. A pair of slots 243, 245 are respectively provided in tubes 239, 241 and are normally angularly displaced from each other thereby to close pellet chamber 115 preventing the transfer of any pellet 113 therefrom, said slots 243, 245 generally constituting opening 125. Trigger mechanism 123 is provided with a torsion spring 247 engaged between a pair of stationary and rotatable posts 249, 251 and a resilient locking member or trip 253 is disposed on the stationary post in locking or displacement preventing engagement with the rotatary post. Inner concentric tube 241 is drivenly connected for conjoint rotation with rotatable post 251 upon wiping engagement of trip 253 with support arm abutment 121, and a cocking lever 255 is integrally formed with the rotatable post for engagement with the support arm abutment upon downward movement thereof to return or re-rotate the rotatable post to its original position in locking engagement with the trip after pellet 113 has been delivered to ladle 119, as discussed hereinafter.

Ladle 119 is rotatably supported in its mounting 235, and a recess portion or spout 257, into which pellet 113 is deposited, is provided in the rightward end of the ladle. To complete the description of casting apparatus 193, a gear 261 is drivingly connected to ladle 119 on its leftward end, as best seen in FIG. 9 for effecting rotation thereof to empty any residue of metal which may remain in spout 257 subsequent to the casting operation, as discussed hereinafter, and another gear 263 carried by rotary solenoid 233 is drivingly meshed with ladle gear 261.

Apparatus, indicated generally at 195 in FIG. 17 and as discussed in detail hereinbefore, for converting nonharmonic acceleration of substantially linearly reciprocally movable means or rack 127 into generally sinusoidal acceleration for another substantially linearly reciprocally movable means or rack 133 comprises means, such as pinion gear 137, for transforming the non-harmonic acceleration of the movement of the first named linearly reciprocally movable means 127 into complimentary rotary movement, and articulated means, such as articulated linkage 129, 131, is conjointly rotatable with the transforming means or pinion gear 137 and pivotally connected with the other linearly reciprocally movable means 133 for imparting thereto the generally sinusoidal acceleration.

Apparatus 195 is provided in the automatic motor assembly machine (not shown) in driving engagement with indexing shaft 145 and gear 147 for inverting or rotatably indexing fixture 17, 19 between casting positions approximately 180° apart in which molten metal is respectively poured into sockets 11 of lower and upper end frame 1, 3 for forming the rigid connection between the end frame and beams 7 predeterminately positioned in the sockets, as discussed hereinafter.

In the operation, with rotatable assembly 31 and lower end frame 1 of dynamoelectric machine 5 assembled on lower fixture 19, as previously described, at the work loading station of the automatic motor assembly machine (not shown), bayonet member 91 of lower slide 15 is initially rotated into position for engagement with flanges 93, 93a of cylindric member 95, and the lower slide is then actuated upwardly driving the cylindric member and shims 33 connected therewith upwardly to the protracted position of the shims extending through their slots 35 in the lower fixture and being disposed about the periphery of the rotatable assembly, as best seen in FIG. 1. The operator then loads stator 9 and upper end frame 3, as previously described, and upper slide 13 is lowered from its original at-rest or raised position by actuating means therefor (not shown) to its lowered or pivoting position conjointly driving upper fixture 17 downwardly therewith on guide pins 41, 41a toward engagement with lower fixture 19 wherein locking arms 43, 43a are pivoted into locking engagement with mating portions on the lower fixture thereby to lock the upper and lower fixtures together.

Upon the lowering of upper slide 13, rods 63, 63a thereof engage fixture rods 65, 65a driving them downwardly against the compressive forces of springs 67, 67a and disengaging clamp collars 78, 78a from abutment with sleeves 73, 73a. Springs 51 urge trunnion block 171 downwardly engaging its plunger 53 with the upper end of shaft 27, and in this manner, opposite trunnions 47 on the trunnions block are now disposed in a set stationary or pivoting position thereby to pivotally engage with elongate slots 173 in yoke 175 which defines the pivoting position of rocker arms 45. At the same time, driving gears 79, 79a (FIG. 4) are moved downwardly with upper slide 13 into mesh with driven gears 83, 83a, and upper slide push pin 181 engages and pivots bell crank 167 against its spring 169 thereby to move wedge 55 to a position retracted relative to its cooperating surface 165 on wedge block 61 for releasing the compressive force of springs 57 to urge the wedge block downwardly into position engagement with upper end plate 3, as best seen in FIG. 2. In this manner, rotatable assembly 31 and upper end frame 3 are clamped or maintained in their respective assembled position with axis A of the rotatable assembly generally perpendicular due to the locating engagement of shaft 27 in locating aperture 25 of lower fixture 19 and with bearing means 39 of the upper end frame jounaled on the upper end of the shaft and seated on thrust washer 40.

With both rocker arms 45, 49 now in their pivoting positions, levers 71, 71a are actuated by air cylinders or other suitable actuating means (not shown), to controllably rotate slide rods 63, 63a and due to the complimentary configurations of the slide rods, sleeve bores 179, 179a and fixture rods 65, 65a, such rotation of the slide rods effects conjoint rotation of sleeves 73, 73a and the fixture rods thereby to pivot stops 75, 75a and clamps 77, 77a inwardly toward positions juxtaposed with the upper and lower ends of stator 9, respectively. At this time, upper slide 13 is automatically raised a slight distance thereby to permit the compressive force of springs 67, 67a to urge fixture rods 65, 65a upwardly for engaging clamps 77, 77a with the lower end of stator 9, and in the pivoting position of rocker arm 45, its trunnions 47 are located in pivoting engagement with the upper end of elongate slots 173 of yoke 175, as shown in FIGS. 1 and 3. As previously mentioned, clamp 77 is assumed to initially engage the stator lower end high portion, and upon such engagement, the various frictions between associated components as well as the inertia of the stator counteracts or contains the compressive force of spring 67 thereby to obviate further upward movement of fixture rod 65 and clamp 77. However, at the same time, the compressive force of spring 67a continues to move fixture rod 65a and clamp 77a upwardly relative to the engaged clamp 77 until clamp 77a engages the stator lower end low portion. At this time, the compressive force of spring 67a is additive to that of spring 67 since both now act on stator 9 through the engagement therewith of clamps 77, 77a, and the additive forces of springs 67, 67a are great enough to effect upward movement of stator bore 37 on shims 33 generally coaxially with axis A of rotatable assembly 31. Upon the upward movement of clamps 77, 77a into engagement the stator 9 and the subsequent conjoint upward movement thereof, it may be noted that fixture rod 65a follows slide rod 63a thereby to effect pivotal movement of pivot arm 49 for permitting slide rod 63 to follow with fixture rod 65, and in this manner, the pivoting acutation of rocker arm 49 compensates for the out-of-square low and high portions on the lower end of stator 9 which, of course, allows the stator to be moved upwardly generally coaxially with axis A of rotatable assembly 31.

Upon the further conjoint upward movement of stator 9 and clamps 77, 77a in response to the additive compressive forces of springs 67, 67a, the stator upper end high portion is assumed to effect initial engagement with stop 75, as previously mentioned, and in response to such engagement, stop 75 is driven or moved upwardly relative to stop 75a. Since stop 75 and sleeve 73 are integral parts of rocker arm 45, the upward relative movement of stop 75 effects pivotal movement of the rocker arm about trunnions 47 thereby to pivotally move opposite sleeve 73a and stop 75a downwardly toward engagement with the lower portion on the upper end of stator 9. When stop 75a and stator upper end low portion engage each other with stop 75 engaged with the stator upper end high portion, as mentioned above, rocker arm 45 is then in its steady state, i.e., not being able to be further pivotally actuated or moved, and the upward movement of stator 9 toward its assembly position is arrested. In this manner, it may be noted that the relative generally vertically spaced apart positions of stops 75, 75a with respect to each other at which the upward movement of stator 9 is arrested defines the assembly position of the stator. Further, it may also be noted that the pivotal movement of rocker arms 45, 49 effected upon the engagement of clamps 77, 77a with the high and low portions on the lower end of stator 9 and also the engagement of the high and low portions on the upper end of the stator with stops 75, 75a respectively, permits the upward movement of the stator bore 37 generally coaxially about the periphery of rotatable assembly 31 along its axis A to the assembly position of the stator without canting or skewing the stator with respect to the rotatable assembly axis thereby to compensate for the out-of-square upper and lower ends of the stator.

When stator 9 is in its assembly position, driving gears 79, 79a are actuated by suitable means, such as rotary solenoids or other actuators well known in the art (not shown), thereby to drivingly rotate driven gears 83, 83a which are meshed therewith. Screw devices 85, 85a which are threadedly engaged with driven gears 83, 83a are driven downwardly in response to the rotation of the driven gears thereby to wedge cooperating male and female locking members 87, 89 and 87a, 89a into locking engagement between frame 161 of upper fixture 17 and the periphery of sleeves 73, 73a. In this manner, the locking engagement of male and female locking members 87, 89 and 87a, 89a between upper fixture frame 161 and sleeves 73, 73a positively locks rocker arm 45 against further pivotal movement thereby to maintain stator 9 against displacement from its assembled position.

With rocker arm 45 so locked against further movement, upper slide 13 is now raised to its original at-rest position disassociating its rods 63, 63a from upper fixture 17 and disengaging its push pin 181 from upper fixture bell crank 167; therefore, upon such disengagement, spring 169 effects pivotal movement of the bell crank thereby to drive wedge 55 into engagement with its cooperating surface 165 on wedge block 61 to contain the forces of wedge block springs 57 as best seen in FIGS. 1 and 2. At substantially the same time, lower slide 15 is initially rotated to a position spacing its bayonet means 91 from cylindric member flanges 93, 93a and thereafter is retracted downwardly to its original at-rest position relative to cylindric member 95. In this manner, upper and lower slides 13, 15 are retracted to their original positions disassociated from fixture 17, 19 which may then be moved or indexed from its work loading station in the automatic motor assembly machine to the casting station therein (not shown) for introducing end-play between components of dynamoelectric machine 5 and for rigidly connecting stator beams 7 and with end frames 1, 3.

Assuming now that fixture 17, 19, having dynamoelectric machine 5 therein with its components in their assembly positions, as previously described, has been translated from the work loading station to the casting station of the automatic motor assembly machine, end-play is now introduced into the dynamoelectric machine, as shown in FIGS. 2 and 8. To introduce the end-play, screw 101 is threadedly rotated in nut 103 upwardly relative thereto by the torque limiting device, indicated generally by the rotational arrow R in FIG. 2, toward engagement with lower end 104 of shaft 27 or with the lower end of shaft spacer 104a if it is employed. Since the lengths of various shafts 27 of rotatable assembly 31 vary from one another and since tolerance build-up permits shafts to extend various lengths or distances from lower end plate, it may be noted that it is necessary to sense or locate the true position of shaft end 104 in order to introduce a predetermined or constant amount of end-play into each dynamoelectric machine irrespective of variances in shaft lengths and tolerance build-ups between components thereof. Upon making contact with shaft spacer 104a, the resistive force thereupon encountered by screw 101 causes the torque limiting device R to slip, and in this manner, further threaded upward movement of the screw is obviated once it so senses or locates the true position of shaft lower end 104.

With screw 101 in its sensing or locating position engaged with the shaft spacer 104a, actuating means (not shown) but indicated by the force arrow F in FIG. 8, is actuated to conjointly drive screw 101, nut 103, and spacer 105 upwardly relatively to guide cylinder 157 disengaging the nut from its seat 190 and engaging the spacer with its movement limiting abutment 109. This upward movement of shaft end sensing assembly 107 conjointly drives rotatable assembly 31 and upper end frame upwardly therewith relative to lower end frame 1 toward an end-play position in which the predetermined amount of end-play defined by travel T is introduced between rotatable assembly 23 and lower end frame 1. This conjoint upward movement for introducing end-play is limited by the engagement of spacer 105 with its cooperating abutment 109 on guide cylinder 157, and it may be noted that travel T therebetween defines the predetermined amount of end-play introduced between rotatable assembly 31 and lower end frame 1. Since upper slide 13 is disassociated from fixture 17, 19, as previously mentioned, spring 169 of bell crank 167 is effective to move wedge 55 in following engagement with its cooperating wedge block surface 165 thereby to maintain wedge block 61 in its raised or up position containing the compressive forces of wedge block springs 57. Rotatable assembly 31 and upper end frame 3 are maintained in their displaced or end-play positions until stator beams 7 are rigidly interconnected with upper and lower end frame 1, 3, as follows.

When guide 199 is moved upwardly in its actuator 201, as shown in FIG. 11, ladle 119 is conjointly moved upwardly therewith into juxtaposition with receptacle 117, and upon such upward movement wiping block 121 engages and moves trip 253 to a position displaced from rotatable post 251 permitting the force of torsion spring 247 to effect concerted rotation of the rotatable post and outer concentric tube 239 connected therewith, FIG. 9. Upon rotation of tube 239, slot 243 therein is brought into registry with slot 245 of interconcentric tube 241 thereby to establish opening 125, and metal pellet 113 which had been supplied by suitable means (not shown) into chamber 115 is transferred by gravity therefrom dropping through the opening into spout 257 of ladle 119. As shown in FIG. 12, shuttle actuator 207 thereafter moves shuttle 205 rightwardly on roller runs 203, 203a to an end or displaced position, and ladle 119 is conjointly movable with the shuttle toward a position entered into RF heater 127 thereby to heat metal pellet 113 in ladle spout 257 for changing the state thereof from solid to molten. After the change of state of metal pellet 113 occurs, shuttle actuator 207 retracts shuttle 205 to the position shown in FIG. 11, and guide actuator 201 thereafter moves guide 199 downwardly in housing 197 to the position shown in FIG. 13 wherein ladle 119 with molten metal therein is juxtaposed with socket 11 of lower end frame 1. As shown in FIG. 14, crank 211 is turned by suitable means (not shown) approximately 180° to actuate linkage assembly 209 which raises support arm 221 causing conjoint upward movement of ladle 119 therewith relative to lower end frame; however, actuation of linkage assembly 209 to raise the support arm also effects rotation of upper sprocket 227 to drive chain 231 and conjointly rotate lower sprocket 229, and since ladle mount 235 is rotatably driven by the lower sprocket, ladle 119 is thereby tipped or pivoted to its casting position in which the molten metal is poured from ladle spout 257 into socket 11 of lower end plate 1 for solidification therein to establish or shrink into the rigid connection between beams 7 and lower end frame 1. It may be noted that since stator beams 7 are generally U-shaped in cross-section, a passage is thereby provided through which at least a portion of the molten metal is poured during the casting operation, as described above, and ladle 119 is moved into juxtaposition relative to the stator beam and socket 11 to effect the pouring of the molten metal through the beam passage into the socket.

After the casting operation, crank 211 is returned to its original position which drives linkage assembly 209 to its original position, and upon the return of the linkage assembly to its original position, sprocket and chain drive 225 is reversely driven thereby to its original position which in turn, pivots ladle mount 235 to its original position. At the same time, guide actuator 201 moves guide 199 upwardly in housing 197 to its original position wherein the casting apparatus 193 is disposed as shown in FIG. 11. To complete the description of the operation of apparatus 193, rotary solenoid 233 is energized driving meshed gears 261, 263 to effect rotation of ladle 119 in its mount 235 to an inverted position for emptying any metal residue from ladle spout 257 which may remain therein after the casting operation, and in this manner, the ladle is cleansed in preparation of receiving another metal pellet or slug 113 during the next cycle of casting apparatus. Although only one apparatus 193 has been described hereinabove along with its casting operation, it is apparent that a plurality of such apparatus can be employed within the scope of the invention for simultaneously casting in place each of beams 7 within each of sockets 11 of end frame 1.

After sufficient time has elapsed to provide for the solidification of the molten metal poured into sockets 11 of lower end frame 1, as above-described, fixture 17, 19 is inverted or rotatably indexed by indexing apparatus 195 of FIG. 17 as follows. Serve motor 135 is actuated to reciprocally drive rack 127 which, in turn, drivingly rotates gear 137 through a preselected or predetermined arc, and since the reciprocal motion imparted by the servo motor has non-harmonic acceleration, as previously mentioned, such is also imparted to the complementary rotation of gear 137. Since articulated linkage 129 is fixedly connected to shaft 139 of gear 137, the articulated linkage in conjointly rotated therewith through the predetermined arc, and articulated linkage 131, which is pivotally connected between articulated linkage 129 and rack 133, thereby effects the reciprocal movement of the rack 133 for drivingly rotating gear 147. It may be noted that the particular connection of articulated linkages 129, 131 between gear shaft 139 and rack 133 transforms or converts the non-harmonic acceleration of the reciprocal movement of rack 127 into generally sinusoidal acceleration, as shown in the graphical representation of FIG. 16, which is imparted to the reciprocal movement of rack 133 and the rotary movement of shaft 145 and gear 147. In this manner, non-harmonic acceleration is transformed into generally sinusoidal acceleration for smoothly inverting or rotatably indexing fixture 17, 19 approximately 180° to an inverted position, and it may also be noted that due to such generally sinusoidal acceleration of the fixture between its upright and inverted positions is accomplished generally in a minimum length of time. Further, it may also be noted that the generally sinusoidal acceleration of the rotary indexing or inversion of fixture 17, 19 compensates for any variations in between the various fixtures employed in the automatic motor assembly machine (not shown) and/or off-center loading of the fixture thereby obviating the necessity of providing expensive and bulky cushioning devices and/or dash pot arrangements for servo motor 135 which, as previously mentioned, were not generally satisfactory.

Figure 7:
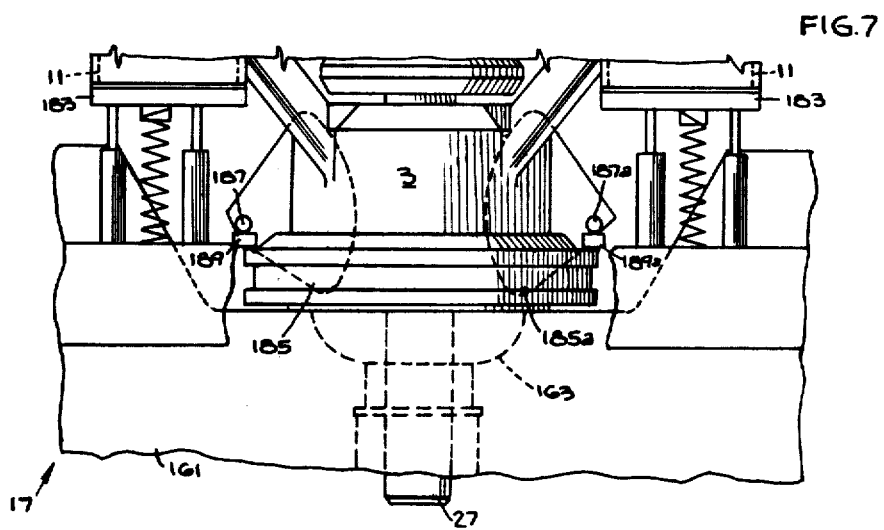

Upon movement of fixture 17, 19 to its inverted or indexed position, swing weights 185, 185a pivot about their shafts 187, 187a to engage their abutments 189, 189a with a portion of upper end frame 3 thereby to maintain it in its predetermined position in abutment with pivotal cap 163 of fixture frame 161, as best seen in FIG. 7. Furthermore, when fixture 17, 19 is in its inverted position, sockets 11 of upper end frame 3 are disposed substantially in the same locations or positions as those of lower end frame 1 when molten metal was poured thereinto, as previously described; therefore, the sockets of the lower end frame are also predeterminately disposed to receive molten metal therein. Casting apparatus 193 is now re-cycled to perform its metal pouring or casting operation, as previously described, thereby to pour molten metal into sockets 11 of upper end frame 3 which, upon solidification, forms a rigid connection between the upper end frame and beams 7. In this manner, it may be noted that end frames 1, 3 are fixedly and rigidly connected by the solidified metal in sockets 11 thereof to beams 7 carried by stator 9 in their respective positions for assembly and that rotatable assembly 31 is journaled in the end frames with a constant and predetermined amount of end-play therebetween.

In view of the foregoing, it is now apparent that novel apparatus for assembling components of a dynamoelectric machine is provided by way of illustration meeting all of the objects and advantageous features set forth hereinabove, as well as others, and that changes in the particular arrangements, shapes and details of components embraced by such novel apparatus may be made by those having ordinary skill in the art without departing from the spirit and scope of the invention, as set out in the claims which follow.

What I claim as new and desire to secure by Letters Patent of the United States is:

1. Apparatus for assembling a pair of opposite end frames of a dynamoelectric machine to a structural component thereof positioned for assembly within receiving means therefor in the end frames, respectively, said apparatus comprising means for moving at least one of the structural component and the end frames to the assembly position and for supporting the structural component and the end frames in the assembly position, means for introducing molten metal into the receiving means to form rigid ties between the end frames and the structural component when supported in the assembly position thereof by said moving and supporting means, and means for inverting said moving and supporting means with the structural component and end frames in the assembly position therein so as to dispose the receiving means of one of the end frames in a position to receive the molten metal from said introducing means subsequent to the solidification of the molten metal introduced into the receiving means of the other of the end frames.

2. Apparatus as set forth in claim 1 wherein said inverting means includes means for converting non-harmonic acceleration of said inverting means into generally sinusoidal acceleration upon the inversion of said moving and supporting means with the structural component and the end frames in the assembly position therein.

3. Apparatus as set forth in claim 1 wherein said inverting means comprises a pair of driven and driving means generally linearaly reciprocably movable, means for transforming non-harmonic acceleration of said driving means into complementary rotary motion through a predetermined arc, and means for translating the complementary rotary motion into generally sinusoidal acceleration including articulated means for conjoint movement with said transforming means through the predetermined arc and for driving pivotal connection with said driven means.

4. Apparatus as set forth in claim 3 wherein said driving means comprises a rack for driving engagement with said translating means.

5. Apparatus as set forth in claim 4 wherein said transforming means comprises a gear rotatably meshed with said rack.

6. Apparatus as set forth in claim 5 wherein one end of said articulated means is connected with said gear for conjoint rotation therewith and the other end thereof is pivotally connected with said driven means.

7. Apparatus as set forth in claim 6 wherein said driven means comprises another rack.

8. Apparatus as set forth in claim 2 wherein said converting means comprises means for effecting indexing rotation with complementary sinusoidal acceleration of said moving and supporting means upon the inversion thereof.

9. Apparatus as set forth in claim 1 further comprising means for dispensing of the metal into said introducing means.

10. Apparatus as set forth in claim 1 further comprising means for supplying to said dispensing means a metal pellet generally constituting a predetermined amount of the metal.

11. Apparatus as set forth in claim 9 wherein said dispensing means includes means for the passage of the metal from said dispensing means to said introducing means.

12. Apparatus as set forth in claim 11 wherein said dispensing means further includes means associated with said dispensing means for opening said passage means to effect the transfer of said metal to the introducing means.

13. Apparatus as set forth in claim 1 further comprising means for melting the metal contained in said introducing means.

14. Apparatus as set forth in claim 13 further comprising means for moving said introducing means to a position at least adjacent said melting means to melt the metal pellet.

15. Apparatus as set forth in claim 14 wherein said moving means is further operable to also move said introducing means with molten metal therein toward a position for introducing it into receiving means, and said moving means including means for tilting said introducing means in its introducing position to flow the molten metal therefrom into the receiving means.

16. Apparatus as set forth in claim 13 further comprising means for moving said introducing means to said melting means and after the melting of the metal then to the receiving means to introduce the molten metal thereinto.

17. Apparatus as set forth in claim 9 further comprising means for moving said introducing means subsequent to the introduction of the molten metal into the receiving means toward a position adjacent said dispensing means so as to accept metal in its solid state therefrom.

18. Apparatus as set forth in claim 17 further comprising means on said moving means for actuating said dispensing means to dispense the metal to said moving means at least upon the movement thereof toward its metal accepting position.

19. Apparatus for assembling a pair of opposite end frames of a dynamoelectric machine to a structural component thereof disposed within means respectively in the end frames for receiving the structural component, the apparatus comprising means for moving at least one of the structural component and the end frames to an assembly position with the structural component disposed within the receiving means of the end frames and for supporting the structural component and the end frames in the assembly position, means for providing a hardenable material in the receiving means adapted to be flowed therein so as to form rigid ties between the end frames and the structural component upon the subsequent hardening of the hardenable material in the receiving means, respectively, as the structural component and the end frames are supported in the assembly position thereof by said moving and supporting means, and means for inverting said moving and supporting means with the end frames and the structural component supported therein in the assembly position so as to dispose the receiving means of one of the end frames in a position wherein the hardenable material may be provided therein to form the rigid tie between the one end frame and the structural component subsequent to the formation of the rigid tie between the other of the end frames and the structural component.

20. Apparatus as set forth in claim 19 wherein the receiving means include at least one open end, and further comprising means for respectively closing the at least one open end of the receiving means so as to contain the hardenable material therein.

21. Apparatus as set forth in claim 19 wherein said providing means comprises means operable generally for supplying at least a predetermined amount of the hardenable material in the receiving means of end frames.

22. Apparatus as set forth in claim 19 further comprising means for heating at least the hardenable material to effect the flowing thereof.

23. Apparatus as set forth in claim 19 wherein said providing means includes means for delivering the hardenable material to the receiving means of the end frames.

24. Apparatus as set forth in claim 19 wherein said inverting means includes means for revolving said moving and supporting means having the end frames and the structural component therein with generally sinusoidal acceleration upon the inversion of said moving and supporting means.

25. Apparatus as set forth in claim 19 wherein the dynamoelectric machine includes a rotatable assembly journaled in at least one of the one and other end frames, and further comprising means for establishing end play between the at least one of the one and other end frames and the rotatable assembly.

26. Apparatus for assembling a pair of opposite end frames of a dynamoelectric machine to a plurality of structural components mounted to a stationary assembly of the dynamoelectric machine with the structural components extending into means in each of the end frames for respectively receiving the structural components and a rotatable assembly of the dynamoelectric machine disposed at least in part within the stationary assembly and journaled in the end frames, the apparatus comprising means for locating the stationary assembly and the rotatable assembly with respect to each other in an assembly position with the structural components disposed in the receiving means and for supporting the stationary assembly, the rotatable assembly, the end frames and the structural components in the assembly position thereof, means for providing a hardenable material in the receiving means and flowing the hardenable material generally about the structural components therein so as to form rigid ties between the end frames and the structural members upon the hardening of the hardenable material in the receiving means when the stationary assembly, the rotatably assembly, the end frames and the structural components are supported in the assembly position by said locating and supporting means, respectively, and means for rotatably indexing said locating and supporting means with the stationary assembly, the rotatable assembly, the end frames and the structural components supported therein in the assembly position toward an inverted position so that the hardenable material may be provided in the receiving means of one of the end frames subsequent to the hardening of the hardenable material provided in the receiving means of the other of the end frames.

* * * * *

UNITED STATES PATENT AND TRADEMARK OFFICE
CERTIFICATE OF CORRECTION

PATENT NO. : 4,004,725
DATED : January 25, 1977
INVENTOR(S) : Jesse A. Stoner

It is certified that error appears in the above-identified patent and that said Letters Patent are hereby corrected as shown below:

Col. 5, line 6, before "located" insert --is--;

Col. 7, line 18, delete "agruendo" and insert --arguendo--;
       line 24, after "pivoted" insert --by--.
Col. 8, line 55, delete "beems" and insert --beams--;
       line 58, delete "maching" and insert --machine--;
       line 65, after "as" insert --a--.
Col. 11, line 60, after "105" insert --,-- (comma).
Col. 13, line 6, delete "rotatary" and insert --rotary--;
       line 21, after "9" insert --,-- (comma).
Col. 14, line 37, after "63a" insert --,-- (comma).
Col. 15, line 39, after "75a" insert --,-- (comma).
Col. 17, line 60, after "which" insert --,-- (comma).
Col. 18, line 46, delete "in".

24, delete "the" (second occurrence) and insert --said--.
Col. 21, line 23, after "of" insert --the--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*